(12) United States Patent
Titmas

(10) Patent No.: US 7,188,791 B2
(45) Date of Patent: Mar. 13, 2007

(54) GRAVITY PRESSURE VESSEL AND METHOD FOR TREATING VULCANIZED RUBBER

(75) Inventor: James A. Titmas, Cuyahoga Falls, OH (US)

(73) Assignee: Eau-Viron, Incorporated, Hudson, OH (US)

( * ) Notice: Subject to any disclaimer, the term of this patent is extended or adjusted under 35 U.S.C. 154(b) by 175 days.

(21) Appl. No.: 11/031,711

(22) Filed: Jan. 7, 2005

(65) Prior Publication Data

US 2006/0151642 A1 Jul. 13, 2006

(51) Int. Cl.
*B02C 19/00* (2006.01)
(52) U.S. Cl. .............. 241/1; 241/21; 241/23; 241/65; 241/301; 241/DIG. 31
(58) Field of Classification Search .............. 241/23, 241/21, 1, 301, 65, DIG. 31
See application file for complete search history.

(56) References Cited

U.S. PATENT DOCUMENTS

| 3,725,314 | A |   | 4/1973  | Pelofsky |
|-----------|---|---|---------|----------|
| 3,853,759 | A |   | 12/1974 | Titmas |
| 5,258,413 | A |   | 11/1993 | Isayev ................ 521/45.5 |
| 6,095,440 | A | * | 8/2000  | Roberson et al. .............. 241/1 |

* cited by examiner

*Primary Examiner*—Mark Rosenbaum
(74) *Attorney, Agent, or Firm*—Renner, Kenner, Greive, Bobak, Taylor & Weber

(57) ABSTRACT

A method for treating vulcanized rubber, the method including the steps of (i) providing an aqueous stream that includes vulcanized rubber particles suspended in water, (ii) feeding the aqueous stream to the top of a hydraulic downdraft column, (iii) conducting the aqueous stream to the bottom of the hydraulic downdraft column, (iv) conducting the aqueous stream into an ultrasonic treatment zone, (v) subjecting the aqueous stream to ultrasonic energy and, (vi) conducting the aqueous stream up a hydraulic updraft column.

13 Claims, 4 Drawing Sheets

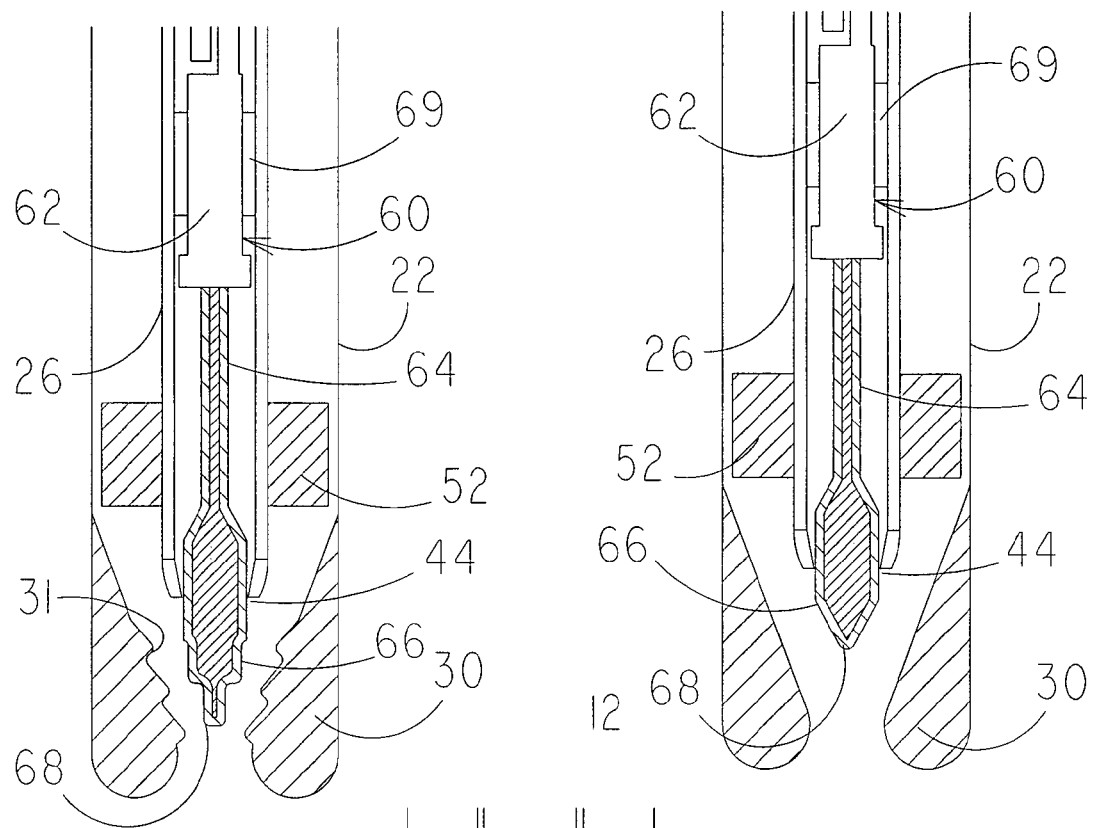
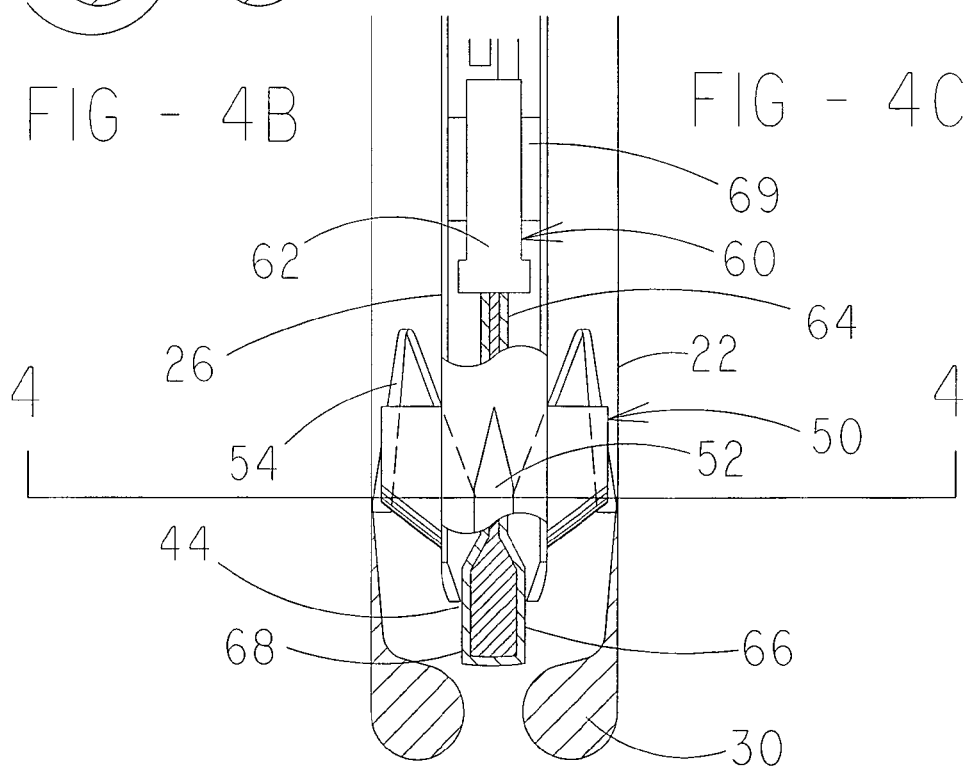
FIG - 4B
FIG - 4C
FIG - 4A

GRAVITY PRESSURE VESSEL AND METHOD FOR TREATING VULCANIZED RUBBER

FIELD OF THE INVENTION

This invention relates to an apparatus and method for treating vulcanized rubber.

BACKGROUND OF THE INVENTION

Vulcanized rubber, which is typically in the form of used tires, continues to be an environmental concern because vulcanized rubber consumes landfills all over the world. The demand for new vulcanized rubber articles (e.g., tires) continues to rise, which places burdens on natural resources. Although attempts have been made to reuse vulcanized rubber, these attempts have largely proved to be technologically and economically inefficient. Indeed, the demand for certain recycled rubber products has fallen from about 100,000 tons per day in 1976 to about 200 tons per day in 1995, while the need for new rubber has risen to over 7,000 tons per day for tires alone in the United States.

One attempt to recycle tires includes depolymerization. In one depolymerization process, tires are ground into a crumb having a rather small particle size (e.g., 1/32"). This crumb is then placed in a batch pressure cooker with cracking oils or salts and heated to allow the additives to penetrate the crumb. Once this batch process is completed, steam and volatile organic compound residuals are vented to the atmosphere (or treated with cost prohibitive measures), and the processed rubber is recovered. Besides the air emissions, this process has other shortcomings. The necessity to grind the tire to such a small crumb size consumes unnecessary time and energy. Indeed, the crumb size necessary to separate the fiber and metal from the vulcanized rubber of tires is only about 1/16 of an inch, and it has been estimated that four times the energy is required to further reduce a 1/16" crumb to 1/32" particle.

Another depolymerization process employs a continuously flowing hydraulic column. Rubber crumb is suspended in water and is allowed to vertically descend down an annulus of the hydraulic column while the suspension is heated and gravity pressurized. Steam and cracking oils are introduced at the bottom of the GPV to effect the depolymerization, and then the treated rubber is directed out of the GPV though a different annuls where it is cooled and depressurized. Noxious air emissions are reduced by cooling the process stream within the GPV. While this process may handle large volumes of rubber, the resultant product has inherent limitations. Namely, the depolymerized rubber has different characteristics than conventional uncured rubber. While depolymerized rubber can provide rubber compositions with increased adhesive properties and tires having improved life, the viscoelastic properties of the depolymerized rubber is believed to be inferior to virgin rubber.

Attempts have also been made to devulcanize (rather than depolymerize) rubber. Devulcanization severs carbon-sulfur bonds of vulcanized rubber whereas depolymerization severs carbon-carbon bonds. One devulcanization process includes subjecting a dry stream of rubber crumb to heat and mechanical compression using a screw feed. The stream of rubber crumb is directed to a treatment point where the stream is subjected to an oscillating head that produces ultrasonic energy. This treatment is believed to sever the carbon-sulfur bond because the resultant product is soft and behaves like uncured rubber. These processes, however, have severe process limitations inasmuch as the effective zone of devulcanization is very small, and therefore very small amounts of materials can pass through the apparatus. Further, the absence of any practical means to recover the investment in heating and pressurization makes these processes economically impractical.

Thus, there is a continuing need to develop processes and apparatus for the treatment of vulcanized rubber to make reuse and recycling thereof technologically and economically feasible.

SUMMARY OF THE INVENTION

In general the present invention provides a method for treating vulcanized rubber, the method including the steps of (i) providing an aqueous stream that includes vulcanized rubber particles suspended in water, (ii) feeding the aqueous stream to the top of a hydraulic downdraft column, (iii) conducting the aqueous stream to the bottom of the hydraulic downdraft column, (iv) conducting the aqueous stream into an ultrasonic treatment zone, (v) subjecting the aqueous stream to ultrasonic energy and, (vi) conducting the aqueous stream up a hydraulic updraft column.

The present invention also includes a gravity pressure vessel of the type that includes a hydraulic downdraft column and a hydraulic updraft column, where the improvement comprises an ultrasonic treatment device positioned within the gravity pressure vessel.

The present invention further includes an apparatus for devulcanizing rubber particles within a continuous liquid stream, the apparatus comprising a first vertical passageway for receiving the liquid stream near the top thereof, a ultrasonic treatment area communicating with said fist vertical passageway near the bottom thereof, a conduit for delivering heat to said ultrasonic treatment area, a device for providing ultrasonic energy to the fluid stream, where the device is positioned within or near said ultrasonic treatment area, and a second vertical passageway communicating with said ultrasonic treatment area for receiving the liquid stream near the bottom thereof and delivering the liquid stream near the top thereof.

BRIEF DESCRIPTION OF THE DRAWINGS

FIG. 4A is a cross-sectional view of a portion of a gravity pressure vessel according to the present invention with a portion of the drawing being a perspective view of a portion of a positioning device; FIGS. 4B and 4C are cross-sectional portions of a gravity pressure vessel according to the present invention.

DETAILED DESCRIPTION OF ILLUSTRATIVE EMBODIMENTS

Figure 1:
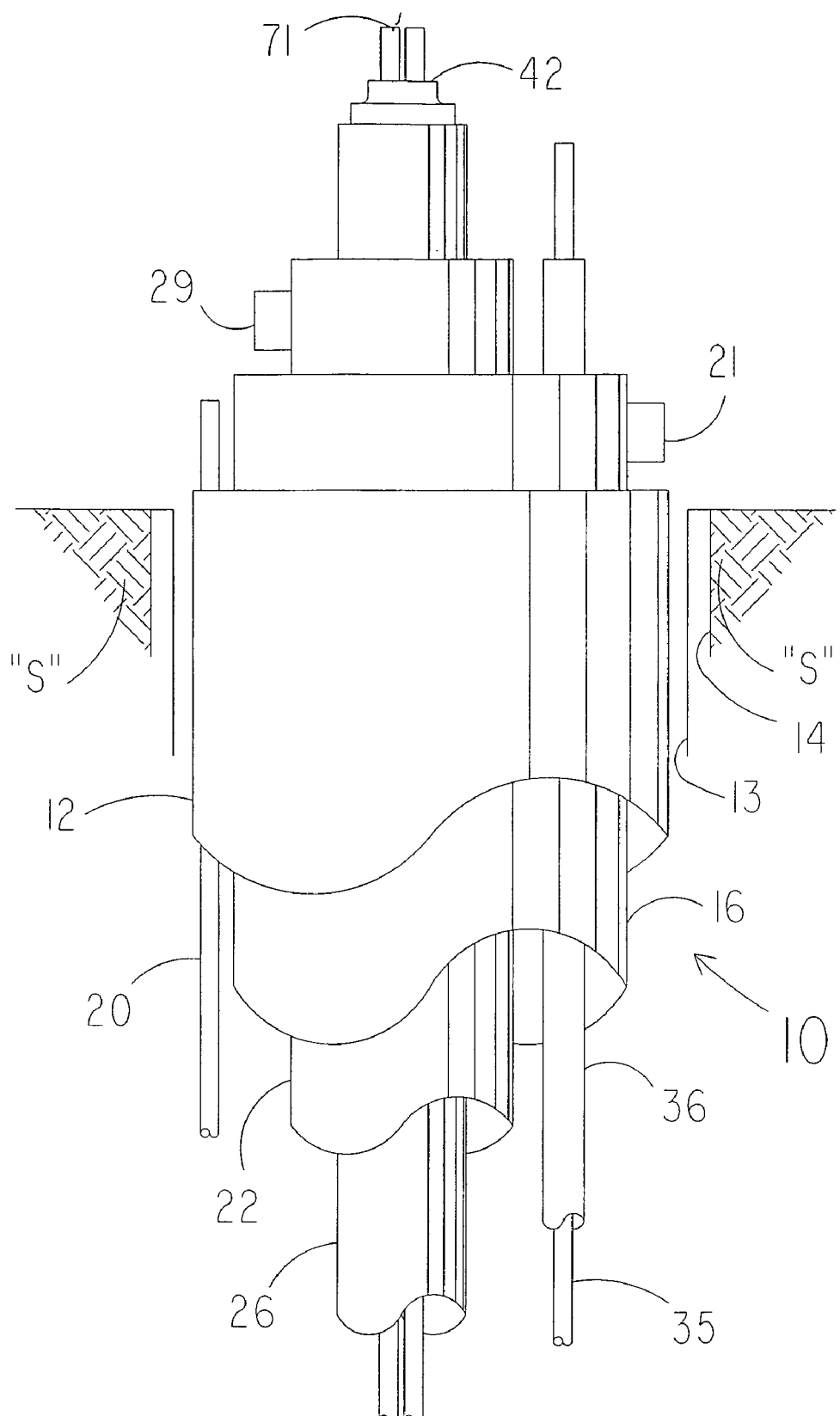
FIG. 1 is a prospective view of the top portion of a gravity pressure vessel according to the present invention.

The process of this invention treats vulcanized rubber by using ultrasonic energy. The process can be maintained in a continuous operation because it employs a novel gravity pressure vessel (GPV) that provides ultrasonic energy to a reaction zone within the gravity pressure vessel.

In one embodiment, vulcanized or cured rubber is ground into a crumb. The average diameter of the crumb can be from about 0.08 to about 0.2 cm or from about 0.10 to about 0.16 cm.

The rubber crumb may then be mixed with water to form a rubber-water blend that can include from about 6 to about 26%, or from about 8 to about 24%, by weight rubber. In one embodiment, the water that is mixed with the rubber is substantially devoid of halides (such as chlorides) and/or minerals (such as calcium, magnesium, and iron), which may collectively be referred to as solids. Substantially devoid refers to the absence of that amount of solids that would otherwise have an appreciable impact on the process and apparatus employed in practicing the invention. In one embodiment, the water that is employed contains less than about 60 or even less than about 50 ppm total dissolved solids (e.g., halides and/or minerals). Also, in one or more embodiments, the water is deaerated. In other words, gases (e.g., oxygen) within the water are removed or substantially removed. In one or more embodiments, the water contains less than 1 mg/l, in other embodiments less than 0.1 mg/l, and in other embodiments less than 0.05 mg/l of total dissolved gases.

In one embodiment, where the vulcanized rubber derives from tires, the tires are initially debeaded and chopped or ground to an average particle size that is less than about 15 cm. These chopped tire particles may then be passed through one or more cracker mills and then filtered. Filtering can include the use of a filter screen such as one having 0.15 mm (about 16 per inch) openings. Magnets or eddy current devices may be employed to remove metals from the crumb, and air classifiers can be used to remove less dense materials, such as fibers, from the crumb. The ground tire may then be mixed with water within an appropriate mix tank (e.g., a detritus tank) that allows for the gravitational separation of the rubber from other impurities that may be within the tire including stones, glass, and sand.

In one or more embodiments, the mixture of water and rubber crumb, which is typically in the form of an aqueous suspension, can then be transferred to a gravity pressure vessel. This aqueous suspension may be referred to as a stream or simply a fluid suspension. The transfer may occur via pumping or by gravity feed. Advantageously, the mixture of water and rubber can be continuously fed to the gravity pressure vessel and continuously treated. Because the capacity of the gravity pressure vessel can vary, the amount of rubber that can be treated by the gravity pressure vessel may likewise vary. Nonetheless, where a gravity pressure vessel is employed that has a diameter of about 24 cm and a depth of about 400 meters (which is consistent with achieving a desirable reaction chamber pressure given the average density of the fluid suspension and the thermal profile), the gravity pressure vessel can process about 60 metric tons per 24 hour period of the rubber materials within the suspension.

In one embodiment, after treatment within the gravity pressure vessel, the mixture, which includes water, treated rubber, and possibly untreated or only partially treated rubber, can be directed to a separation tank. The treated or partially treated rubber may include depolymerized rubber in addition to the devulcanized rubber. This separation tank may simply include a settling tank or optionally a centrifuge, filter, or screen. Within this separation tank, the treated rubber can be separated from the water and untreated rubber. In one embodiment, this separation can be achieved by gravitational separation because the density of the treated rubber is less than that of the untreated rubber. In one or more embodiments, the treated or untreated rubber advantageously does not coat or stick to the walls of the system (e.g., pipes or containers), which means that the treated or untreated rubber does not materially affect the flow of the process. It is believed that the water acts as a lubricant when the rubber is fully submerged therein. The treated rubber can be optionally dewatered, optionally bailed, or optionally pelletized for future use, which may include compounding such as is commonly conducted within a Banbury mixer. In one embodiment, an extruder mixer equipped with a strainer extrusion plate, which facilitates advancing the product to finishing mills, pelletizing, or bailing. Although certain markets may accept small particles that are not depolymerized or devulcanized, the materials processed within the gravity pressure vessel can be redirected back to the gravity pressure vessel for a second or multiple passes.

Figure 2:
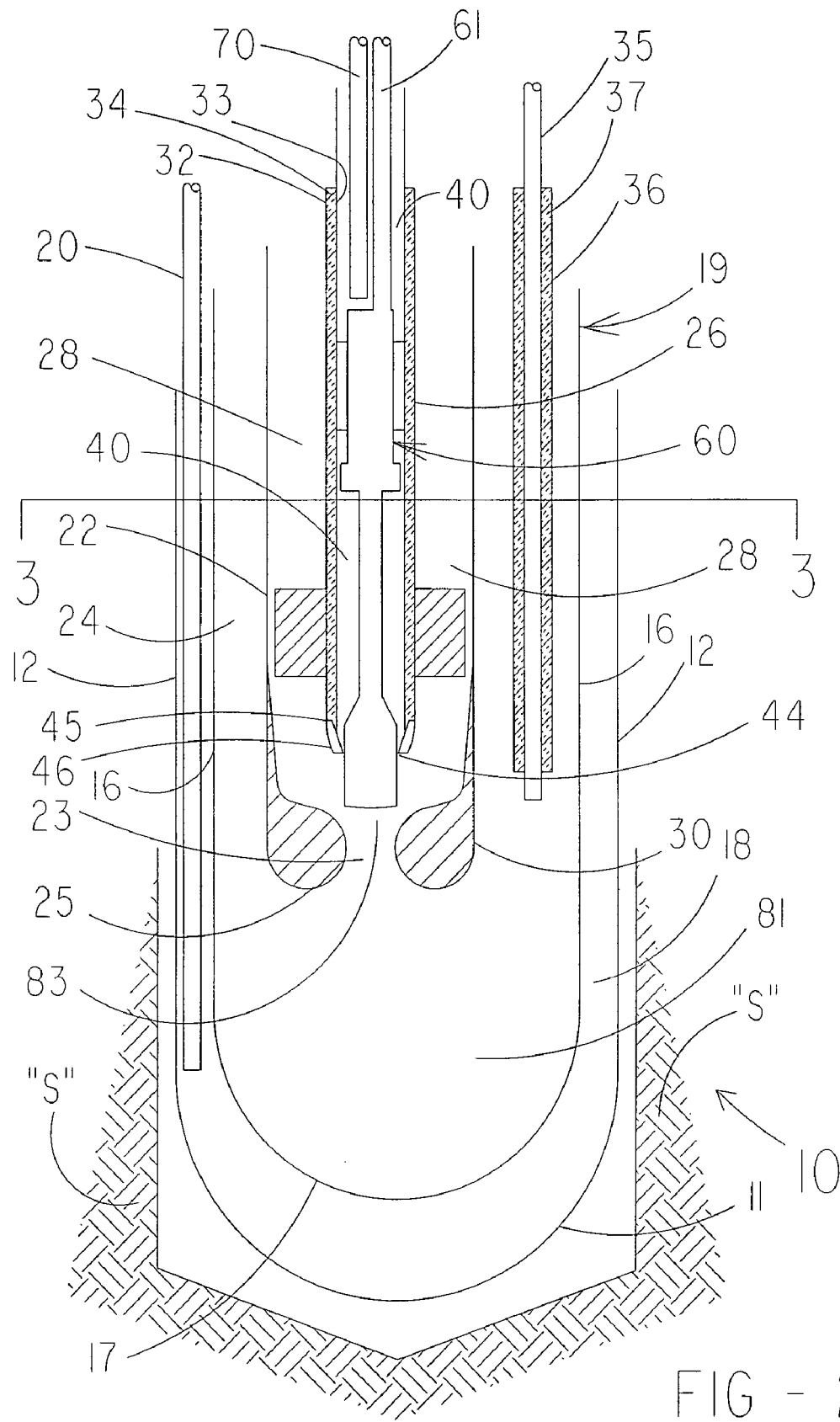
FIG. 2 is a cross-sectional view of the lower portion of a gravity pressure vessel according to the present invention.
Figure 3:
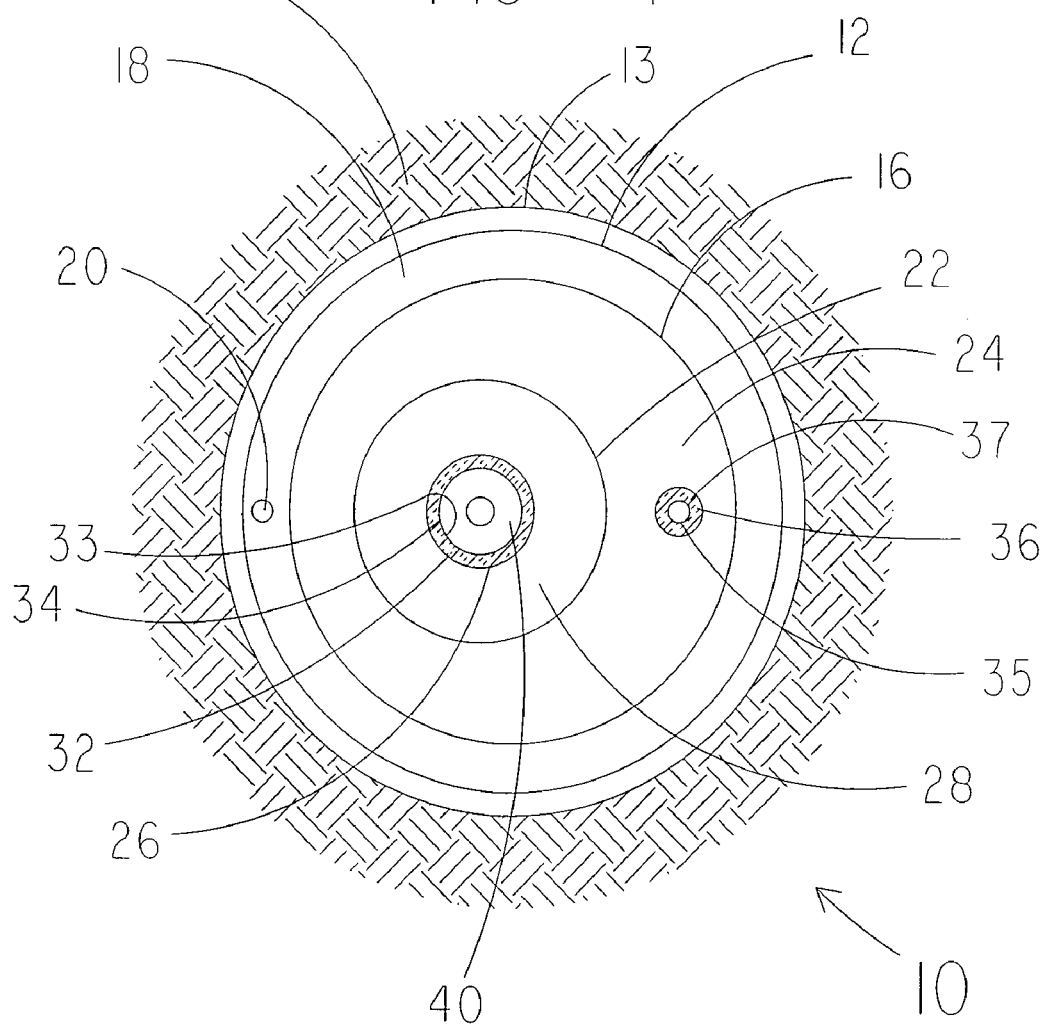
FIG. 3 is a cross-sectional view taken along 3—3 of the gravity pressure vessel depicted in FIG. 2.

Treatment of the vulcanized rubber occurs within a gravity pressure vessel that provides ultrasonic energy to a fluid stream in which the vulcanized rubber is present. One or more embodiments of a gravity pressure vessel can be described with reference to the figures. As shown in FIGS. 1–3, gravity pressure vessel 10 preferably includes optional outer tubular casing 12, which may also be referred to as a long string or containment casing, positioned in strata S in a bore with the earth. Casing 12 includes closed lower end 11. Outer tubular casing 12 can be separated from strata S with a grout (e.g., thermosetting grout) to control the intermixing of fluids that may be present within strata S, to reduce heat losses from the apparatus, to protect outer tubular casing 12 from adverse corrosive effects of the strata S, and to accommodate the setting of casing 12 after thermal expansion of the casing 12 has taken place. Optionally, an outer surface casing 13 may be employed, which is an additional tubular member, which may be referred to as a setting casing, encompassing outer tubular casing 12 for the purpose of protecting water aquifers during drilling of the long-string chamber or hole. Another optional tubular 14, which may be referred to as a conductor pipe, may also be pressed into the earth; this tubular may be employed to align and guide drilling equipment.

Concentric within and spaced from outer tubular casing 12 is outer vessel wall 16, which has lower closed end 17 (shown in FIG. 2). Outer vessel wall 16 and lower closed end 17 form vessel casing 19. The space between outer tubular casing 12 and outer vessel wall 16 forms an outer isolating annulus 18, which may act as a mutual barrier to protect strata S from the apparatus and to protect the apparatus from the strata. This isolation may be enhanced by evacuating outer isolating annulus 18 to a lower pressure, such as to approximately 0.001 of an atmosphere. Under these conditions, the integrity of outer tubular casing 12 and outer vessel wall 16 can be verified, heat loss to the strata from the apparatus can be reduced, and the corrosive effects on the surface of both outer tubular casing 12 and outer vessel wall 16 can be reduced. A drop tube 20 can be positioned within outer isolating annulus 18 to house monitoring devices such as thermocouples.

Concentric within and spaced from outer vessel wall 16 is counterflow heat-exchange baffle tubular 22 (which may be referred to as counterflow tubular). The space between outer vessel wall 16 and counterflow tubular 22 forms outer vessel annulus 24, which is essentially a vertical passageway or hydraulic down-draft column that may include an inlet 21 (shown in FIG. 1).

Concentric within and spaced from counterflow tubular 22 is inner-wall tubular 26. The space between inner-wall tubular 26 and counterflow tubular 22 forms inner-vessel annulus 28, which defines a second vertical passageway or hydraulic updraft column that preferably includes outlet 29 (shown in FIG. 1). Couterflow tubular 22 includes opening 23 (shown in FIG. 2) at or near lower end 25. Opening 23 allows down-draft column 24 to fluidly communicate with up-draft column 28.

In one or more embodiments, opening 23 of counterflow tubular 22 can have a reduced diameter; in other words, the diameter of opening 23 is smaller than the diameter of tubular 22. A multitude of reducing mechanisms or devices can be employed. In one embodiment, as shown in FIG. 2, counterflow tubular 22 includes baffle or lobe 30. As shown in FIGS. 4A–4C, baffle 30 can comprise various shapes, sizes, and configurations. Baffle 30 may advantageously alter opening 23. As specifically shown in FIG. 4B, baffle 30 can include venturi ridges 31. These ridges may provide advantageous mixing as fluid contacts the ridges.

In one embodiment, as shown in FIGS. 2 and 3, inner-wall tubular 26 includes outer insulating tubular 32 and inner insulating tubular 33, which is concentrically spaced within outer insulating tubular 32. The space between tubular 32 and tubular 33 forms inner-insulating annulus 34, which may be filled with an insulating material or can be evacuated (vacuum) to reduce heat transfer from up-draft annulus 28 into annulus 40.

The area within inner-wall tubular 26 defines cylindrical duct 40, which includes top opening 42 (shown in FIG. 1) and lower opening 44 at lower end 45. In one or more embodiments, lower opening 44 can be reduced in diameter (i.e., the diameter of the opening can be smaller than the diameter of tubular 26). In one or more embodiments, the reduction of lower opening 44 can be achieved by including a reduction ring or nozzle 46.

Gravity pressure vessel 10 may also include a steam feed pipe 35, which can be eccentrically suspended within vessel 10 at several locations. In one embodiment, steam pipe 35 is set within outer vessel annulus 24. In one embodiment, steam pipe 35 can be positioned within an insulating outer shell 36, with the space therebetween forming steam pipe annulus 37. This annulus may be insulated or evacuated to prevent the premature loss of heat from steam pipe 35 as steam is conveyed from the top of the apparatus to the location where the steam is injected into the vessel. In other embodiments, steam pipe 35 can be replaced by or used in conjunction with other delivery tubulars that can provide other forms of energy to the GPV such as microwave energy.

In accordance with the present invention, GPV 10 includes a device that delivers ultrasonic energy to the fluid within the GPV. Useful ultrasonic devices produce ultrasonic energy of a type that severs the carbon-sulfur bonds within vulcanized rubber or otherwise has an advantageous impact on the vulcanized rubber. In one embodiment, ultrasonic treatment device 60 provides energy in the form of ultrasonic waves having an amplitude of from about 5 mm to about 20 mm (optionally from about 10 mm to about 15 mm), and at a frequency of from about 20 kilohertz to about 150 kilohertz (optionally from about 30 kilohertz to about 60 kilohertz).

The invention is not limited to the use of any particular ultrasonic device. As those skilled in the art will appreciate, numerous devices, many of which are commercially available, can be employed to produce ultrasonic energy. In one or more embodiments, as shown in FIGS. 4A–4C, ultrasonic device 60 can be positioned within cylindrical duct 40. In one or more embodiments, as shown in ultrasonic device 60 includes converter 62 and driver 64. In one embodiment, driver 64 is fixedly attached to converter 62. Converter 62 can advantageously convert electrical energy into mechanical energy (i.e., vibrational energy). This conversion of energy can take place by using known techniques. The vibrational energy can be transferred to driver 64 by using known techniques. For example, electrical energy can be transferred to a signal generator that produces an oscillation of certain amplitude and frequency. This energy can be magnified by use of an amplifier and transferred to a driver. Driver 64 can then transfer the vibrational energy to the fluid within the GPV in the form of the desired ultrasonic energy. Electrical energy can be transferred to converter 62 via wire 61.

Driver 64 may include a contact head 66, which interfaces with the fluid within the GPV. Contact head 66 may be of various shapes, sizes and configurations. For example, contact head 66 can include an anvil shape as depicted in FIG. 4A, include venturi ridges as depicted in 4B, or include an angular shape as depicted in 4C. The various shapes and sizes of contact head 66 may produce various desired advantages. For example, venturi ridges can induce mixing and thereby increase the aspect ratio of the reaction surface (i.e., increase exposure of the vulcanized rubber particles to the ultrasonic energy). Or, the angular configuration of contact head 66 may facilitate transfer of the fluid past the head and thereby decrease exposure to the ultrasonic energy.

In one or more embodiments, contact head 66 may include a protective coating 68. Protective coating 68 may cover the entire surface of contact head 66 or driver 64, or it may optionally cover only a portion thereof. In one embodiment, protective coating 68 may include an erosion resistant coating such as a hardened steel or one or more of the various alloys that are commonly used to provide protection coatings such as chromium-tungsten alloys. Exemplary alloys include STELLITE ALLOYS™ (Stellite) or BARBERRITE™ (Dycon International).

In one or more embodiments, the positioning of contact head 66 within cylindrical duct 40 can provide advantageous results. In one or more embodiments, as shown in FIGS. 4A–4C, contact head 66 extends out of lower opening 44 of inner wall tubular 26. In this embodiment, contact head 66 occupies substantially all of opening 44 and therefore only leaves a small gap. In one embedment, this gap is from about 0.16 cm to about 0.04 cm around the circumference of opening 44. By occupying substantially all of opening 44, several advantages can be achieved. First, lateral movement of driver 64 can be reduced, which may prevent the thrashing thereof. It may also be advantageous, however, for a sufficient gap to exist between contact head 66 and lower end 45 of tubular 26 (which may optionally be reduced by ring 46); contact between contact head 66 and tubular 26 (or ring 46) may deleteriously prevent movement of head 66, which movement may advantageously provide ultrasonic energy to the fluid within the GPV. The gap may also provide a passage for gas from duct 40 through opening 44.

Figure 4:
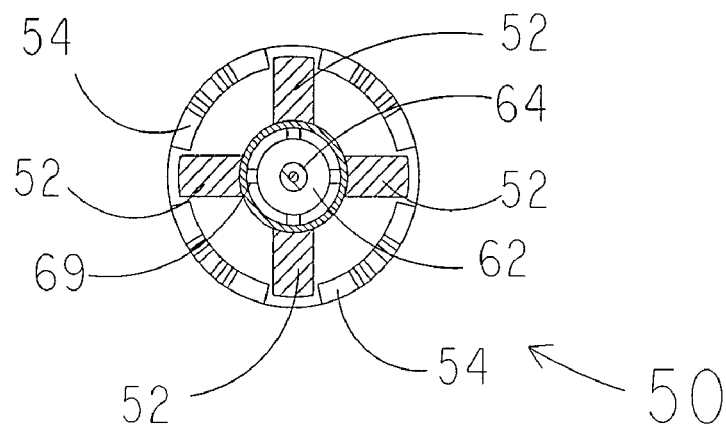
FIG. 4 is a cross-sectional view taken along 4—4.

In one or more embodiments, inner wall tubular 26 is centered within counterflow tubular 22. Also, inner wall tubular 26 may be at least partially supported by counterflow tubular 22. In one or more embodiments, inner wall tubular 26 may be advantageously centered and optionally supported by a positioning system. An exemplary positioning system 50 is shown in FIGS. 4 and 4A. Here, inner wall tubular 26 includes projections 52, which may be fixedly attached thereto near or approximate to bottom 45. In one embodiment, inner wall tubular 26 includes two projections positioned 180° from one another, in another embodiment, it includes three projections positioned 120° from one another, and in another embodiment it includes four projections positioned 90° from one another. In one or more embodiments, the projections 52 can mate or nest within baffles 30 and thereby center tubular 26 within tubular 22.

In one or more embodiments, counterflow tubular 22 includes a support mechanism that can mate or otherwise interact with projections 52 and thereby position and optionally support inner wall tubular 26 in a desired location. For example, and as shown in FIGS. 4 and 4A, counterflow tubular 22 can include support bracket 54, which may be fixedly attached thereto. In one embodiment, support bracket 54 can include a centering ring as shown in FIG. 4. Support 54 may include guide surfaces for mating with and positioning projections 52. The use of a positioning system 50 as shown in FIGS. 4 and 4A, may advantageously not only allow for support and centering of inner wall tubular 26, but may also allow for the removal of inner wall tubular 26 from GPV 10 without removal of counterflow tubular 22. In one or more embodiments, projection 52 may be tapered to further assist in centering tubular 26 within tubular 22.

In one or more embodiments, ultrasonic device 60 can be rigidly positioned within inner wall tubular 26. For example, and as shown in FIGS. 4A–4C, ultrasonic device 60 can be fixedly positioned within inner wall tubular 26 by attachments 69. Several attachments can be used such as brackets or welding. In one or more embodiments, device 60 is rigidly affixed within inner wall tubular 26 at converter 62. This configuration may advantageously provide for minimal interference with driver 64. In one or more embodiments, rigid attachment of device 60 within inner wall tubular 26 advantageously provides for the precise positioning of contact head 66. This positioning advantageously includes positioning with respect to opening 44 (e.g., within reduction ring 46), and with respect to the surface area of contact head 66 that extends out of inner wall tubular 26 (i.e., out of opening 44).

A gas tubular 70 can also be suspended within annulus 40 as shown in FIG. 2. This gas tubular can deliver gas to annulus 40. In one or more embodiments, gas tubular 70 can deliver gas near or approximate to the location of treatment device 60. Gases that can be employed within annulus 40 include inert gases such as nitrogen as well as nitrogen/oxygen mixtures such as air. The gas can be delivered to tubular 70 via inlet 71 (shown in FIG. 1). In one or more embodiments, tubular 70 communicate with a pressure control device (not shown).

According to the present invention, ultrasonic energy is delivered to a fluid stream containing vulcanized rubber crumb or particles within a gravity pressure vessel. In one embodiment, the fluid stream containing vulcanized rubber crumb can be introduced into gravity pressure vessel 10 at inlet 21 and conducted down vertical down-draft column 24. As the stream proceeds down column 24, the stream is subjected to increased pressure due to gravitational forces. And, the stream may be advantageously heated by heat or other energy that can be transferred across counterflow tubular 22. In one ore more embodiments, as the fluid stream is heated, the viscosity of the fluid can be reduced, which advantageously facilitates flow through the GPV.

At or near the lower closed end 17 of GPV casing 19, the fluid enters mix zone 81, where it can be heated by steam or other energy released from pipe 35. In one embodiment, pipe 35 injects steam into the vessel at or near mix zone 81. Injecting steam at or near mix zone 81 advantageously allows a maximum amount of energy to be recovered from the stream flowing through the vessel; advantageously as the heated fluid travels up annulus 28, the heated fluid can transfer heat to the fluid descending down vertical down-draft column 24 via counterflow tubular 22, which would act as a heat exchanger.

Within mix zone 81, the fluid stream may advantageously be brought at or near saturated liquid vapor conditions. As those skilled in the art appreciate, this is the condition where water and steam simultaneously exist. It is believed that these conditions are advantageous for the ultrasonic treatment of the vulcanized rubber. Accordingly, in one or more embodiments, a pressure of about 18 to about 27 atmospheres (optionally from about 20 to about 25 atmospheres) and a temperature of about 200 to about 240 (optionally from about 210° C. to about 230° C.) may be maintained. Those skilled in the art appreciate that at these temperatures and pressures, the process of the present invention operates at sub-critical conditions. Also, those skilled in the art recognize that other temperatures and pressures may be required or can be used depending on the nature of the selected rubber or the presence of other constituents that may be present within the stream.

The heat within mix zone 81 can be regulated by the amount of steam introduced into the mixed zone, which can be manipulated based upon temperature readings taken from monitoring equipment, such as thermocouples, that may be suspended within the gravity pressure vessel.

The fluid steam is then directed from mix zone 81 into ultrasonic treatment zone 83 via opening 23. As noted above, counter flow tubular 22 may include a restricted lower end 25 such as may be accomplished via baffle 30. This restriction advantageously allows the fluid stream to be directed in a desired manner into treatment zone 83. In one or more embodiments, this restriction in the size of opening 23 can have an advantageous impact on the aspect ratio of the fluid stream and the exposure of the vulcanized rubber to the ultrasonic energy.

Within zone 83, the fluid stream is subjected to ultrasonic energy. Ultrasonic treatment device 60 is preferably suspended within cylindrical duct 40 at or near the bottom opening 44 thereof so that treatment device 60 can deliver ultrasonic energy to ultrasonic treatment zone 25. It is believed that the ultrasonic energy, in combination with the formation and collapse of micro-steam bubbles in the heat saturated water, causes a shockwave to penetrate the water and the suspended solids when the steam bubbles subsequently collapse. In other words, it is believed that the mechanical stress severs the carbon-sulfur bonds.

After exposure to ultrasonic energy within treatment zone 83, the fluid stream proceeds into updraft column 28 to the top of the GPV and out of outlet 29. In order to facilitate movement of the fluid stream through treatment zone 83 and up annulus 48, a pressure drop may be created. In other words, there is a pressure differential between downdraft column 24 and updraft column 28. This pressure drop can be less than 10 atmospheres, in other embodiments less than 8 atmospheres, and in yet other embodiments less than 6 atmospheres. In one or more embodiments, the pressure drop is sufficient to overcome any reduction in flow velocity caused by any restriction at lower end 25 of counterflow tubular 22.

In one or more embodiments, a pressure drop can be achieved by the introduction of gas into treatment zone 83 via the gap that can exist between contact head 66 and lower end 45 (e.g., ring 46) of inner wall tubular 26. Within this embodiment, a gas within annulus 40 (which may be provided by tubular 70) is maintained at a positive pressure so that it will enter (such as by bubbling or bleeding) into treatment zone 83. In one or more embodiments, the introduction of gas into the updraft column is believed to have an advantageous impact because the gas, as it travels upward, expands as it is subjected to less pressure. As a result, the stream in the updraft column is less dense, thereby causing a pressure drop between the downdraft and updraft columns.

In one or more embodiments, the gas within annulus 40 can provide additional advantages. For example, the gases can be employed to cool ultrasonic device 60. This can be advantageous inasmuch as it may be desirable to operate ultrasonic device 60 at temperatures that are less than the temperatures experienced within mix zone 83 and updraft column 28. It is also advantageous to operate ultrasonic device 60 in a gas environment rather than a liquid environment, by maintaining annulus 40 at a positive pressure, the fluid stream entering annulus 40 can be reduced or precluded.

In order to demonstrate the practice of the present invention, the following example is contemplated. This example should not, however, be viewed as limiting the scope of the invention. The claims will serve to define the invention.

EXAMPLES

Prospective Example 1

By way of an example a fluid suspension of 10% vulcanized SBR rubber solids will be prepared by reducing the raw materials in the form of tires into a reasonably clean crumb of 16 mesh size. Fiber cord would then be removed by air classification. The intake to the gravity pressure vessel is proportioned so that stone and grit have been removed having failed to cross a detritus tank of several feet in length. Water velocities are maintained so that vulcanized rubber, slightly denser than water at room temperature will remain in suspension in the detritus tank while stone, glass and grit will settle and accumulate in the bottom of the detritus tank to be extracted at the convenience of the operator.

The outer vessel wall will be selected as a standard well tubular of 24.45 cm diameter and a 0.9525 cm wall thickness. The heat exchange baffle will be 17.78 cm diameter tubular with a wall thickness of 0.635 cm providing a down-draft cross sectional area of 150.78 square cm. The cylindrical duct will have an outside diameter of 10.16 cm and a wall thickness of 0.635 cm. The updraft cross sectional area is thus 133.04 square cm. For heat transfer enhancement the initial downdraft velocity of flow will be selected to be 50 cm per second or 7.54 liters per second, or 651,456 liters (or grams) per day. At 10% suspended solids that equates to 65.1 metric tones of rubber per day.

Selecting a peak saturation temperature of 208.8 degrees Celsius (or a saturated pressure of 18.3 atmospheres) the peak conditions water density would be 905.7 grams per liter or a simple average weight per liter of 953 grams. The depth of the gravity pressure vessel, for feed water at ambient conditions, would be 200 meters. In order to achieve the required temperature rise the heat exchange baffle would be maintained in a high state of cleanliness as may be afforded given the very low total dissolved solids and frequent and convenient cleaning means known to the gravity pressure vessel arts. As water would likely be re-circulated in a nearly closed loop, the average density would be effected by feeding the gravity pressure vessel at a higher temperature, thus increasing the required depth to 300 meters to sustain the same reaction chamber gravity pressure.

If the air feed to the reaction chamber were balanced in operation such that the updraft column had roughly half of the total weight of the downdraft column, a pressure drop of 8 atmospheres could be accommodated through the devulcanization reaction chamber without the need a pump to sustain flow through the gravity pressure vessel. The gravity pressure itself would become an air lift pump 300 meters high. Conventional drilling arts pipes tubulars can easily manage the physical stresses involved as selected in materials and fabrication by those normally skilled in those arts.

Various modifications and alterations that do not depart from the scope and spirit of this invention will become apparent to those skilled in the art. This invention is not to be duly limited to the illustrative embodiments set forth herein.

What is claimed is:

1. A method for treating vulcanized rubber, the method including the steps of:
    (i) providing an aqueous stream that includes vulcanized rubber particles suspended in water;
    (ii) feeding the aqueous stream to the top of a hydraulic downdraft column;
    (iii) conducting the aqueous stream to the bottom of the hydraulic downdraft column;
    (iv) conducting the aqueous stream into an ultrasonic treatment zone;
    (v) subjecting the aqueous stream to ultrasonic energy; and, (vi) conducting the aqueous stream up a hydraulic updraft column.

2. The method of claim 1, further comprising the step of introducing steam into the aqueous stream at or near the bottom of the hydraulic downdraft column.

3. The method of claim 2, where the stream is brought to saturated liquid vapor conditions.

4. The method of claim 1, where the ultrasonic energy is in the form of ultrasonic waves having an amplitude of from about 5 mm to about 20 mm and a frequency of from about 25 kilohertz to about 150 kilohertz.

5. The method of claim 1, further comprising the step of introducing a gas into the ultrasonic treatment zone.

6. The method of claim 1, further comprising the step of heating the aqueous stream within the hydraulic downdraft column from heat released from the aqueous stream traveling up the hydraulic updraft column.

7. The method of claim 1, comprising the step of restricting the flow of the aqueous stream as it is conducted into the ultrasonic treatment zone.

8. The method of claim 1, where said step of conducting the aqueous stream to the bottom of a hydraulic downdraft column, said step of conducting the aqueous stream into an ultrasonic treatment zone, said step of subjecting the aqueous stream to ultrasonic energy, and said step of conducting the aqueous stream to a hydraulic updraft column occur within a gravity pressure vessel.

9. The method of claim 8, where the gravity pressure vessel includes a device for providing ultrasonic energy.

10. The method of claim 9, where the device includes an ultrasonic driver that is in contact with the aqueous stream.

11. The method of claim 10, where the ultrasonic driver contacts the aqueous stream at or near the ultrasonic treatment zone.

12. The method of claim 11, where the ultrasonic treatment zone is at or near the transition between the hydraulic downdraft column and the hydraulic updraft column.

13. The method of claim 1, where the water includes less than 1 mg/l dissolved gases.

* * * * *